United States Patent [19]

Konishi et al.

[11] 3,887,653

[45] June 3, 1975

[54] PROCESS FOR PRODUCTION OF GRAFT COPOLYMERS, THE SUBSTRATES OF WHICH CONTAIN ALLYL DERIVATIVES OF MALEIC ACID AND MALEIC ACID ANHYDRIDE

[75] Inventors: Kunio Konishi, Takatsuki; Tsuneo Tsubakimoto, Toyonaka; Masao Nikki, Ibaragi, all of Japan

[73] Assignee: Nippon Shokubai Kagaku Kogyo, Ltd., Osaka, Japan

[22] Filed: Nov. 28, 1972

[21] Appl. No.: 310,012

[30] Foreign Application Priority Data

Dec. 1, 1971  Japan.............................. 46-096290

[52] U.S. Cl.......... 260/885; 260/45.7 P; 260/45.85; 260/45.95; 260/78.5 UA; 260/78.5 BB; 260/836; 260/881; 260/882; 260/883; 260/884; 260/885; 260/886; 260/4 R; 260/878 R; 260/879

[51] Int. Cl......................... C08f 15/00; C08f 19/00

[58] Field of Search..................... 260/885, 78.5 UA

[56] References Cited
UNITED STATES PATENTS 2,958,673   11/1960   Jen...................................... 260/885

OTHER PUBLICATIONS

Chem. Abstracts, No. 4038g, 1961.

*Primary Examiner*—John C. Bleutge
*Assistant Examiner*—Richard B. Turer
*Attorney, Agent, or Firm*—Sherman & Shalloway

[57]  ABSTRACT

A process for the preparation of graft copolymer which comprises graft-copolymerizing at least one ethylenically unsaturated monomer (C) to a substratum polymer (AB) having pendant double bond, said substratum polymer (AB) being prepared from at least one comonomer (A) expressed by the following general formula

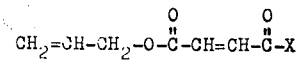

wherein X is —OH, —O—CH$_2$—CH$_2$—OH, —O—CH$_2$—CH(CH$_3$)—OH, —O—CH(CH$_3$)—CH$_2$—OH, —O—CH$_2$—CH$_2$—NH$_2$ or —NH$_2$, and at least one ethylenically unsaturated monomer (B).

5 Claims, No Drawings

PROCESS FOR PRODUCTION OF GRAFT COPOLYMERS, THE SUBSTRATES OF WHICH CONTAIN ALLYL DERIVATIVES OF MALEIC ACID AND MALEIC ACID ANHYDRIDE

This invention relates to a novel process for the production of graft copolymers. More particularly, the invention relates to a process for the preparation of graft copolymers which comprises grafting an ethylenically unsaturated monomer to a specific substratum polymer having pendant double bonds.

As the known process for preparing graft copolymers by grafting monomers to polymers, there can be mentioned a process comprising grafting acrylonitrile and styrene to a rubbery polymer of the butadiene type to prepare a so-called ABS polymer and a process comprising polymerizing styrene in the presence of a butadiene-styrene rubber to prepare a so-called high impact polystyrene. Further, a so-called AAS polymer obtained by employing an acrylic ester rubber polymer instead of the polymer of the butadiene type in the first-mentioned process has been developed to provide a graft copolymer in which the fatal defect of the ABS polymer, i.e., poor weatherability, is improved while merits of the ABS polymer can be retained. However, this AAS polymer has a defect of a low graft ratio. Therefore, development of a process capable of providing a graft copolymer free of this defect has been highly demanded in the art.

Impact-resistant polymer compositions can generally be prepared by blending a rigid polymer with a graft copolymer rubber having branches of the rigid polymer. For instance, an AAS polymer of the graft-blend type is prepared by graft-copolymerizing acrylonitrile and styrene to an acrylic ester rubber and blending the resulting copolymer with an acrylonitrile-styrene copolymer. Further, an impact-resistant polyvinyl chloride resin is prepared by graft-copolymerizing a monomer of vinyl chloride to an acrylic ester rubber or ethylene-vinyl acetate copolymer rubber and blending the resulting graft copolymer with a polymer of vinyl chloride. In each case, however, a defect of a low grafting ratio is inevitably observed and in particular, no suitable method has been developed to graft-copolymerize monomeric vinyl chloride to an acrylic ester rubber. Accordingly, development of a process overcoming this defect has been highly demanded in the art.

In the field of synthetic high molecule latices, it is well-known that when a latex of a polyvinyl acetate is prepared by employing, for instance, polyvinyl alcohol as an emulsifier, a part of the polyvinyl alcohol is graft-copolymerized to the polyvinyl acetate and a stable latex can be prepared. However, it is impossible to prepare a latex of an acrylic polymer such as a polymer of an acrylic acid ester by employing a water-soluble high molecule compound as an emulsifier, and if possible, the resulting latex is inferior in stability and the viscosity thereof is too low for various industrial applications.

It may be considered that it would be possible to obtain a stable latex of a high viscosity by grafting a water-soluble polymer to an acrylic ester latex, but such latex has not been known as yet. Only attempts have been made to prepare a graft-polymer-like product by over-polymerizing acrylic acid or methacrylic acid on the outside of latex particles, namely not by the graft copolymerization but by the addition reaction or condensation reaction (Japanese Patent Publication No. 13615/72 and Japanese Patent Application Laid-Open Specification No. 3344/72 of B. F. Goodrich Co.).

As another similar latex, a so called alkali-swellable latex has been developed. This latex is prepared by adding a considerable amount of an unsaturated acid monomer to an acrylic acid ester monomer and copolymerizing them. However, the viscosity of the resulting latex varies greatly depending on the pH condition, and the resulting latex involves problems concerning the luster and strength of a coating film obtained therefrom.

In view of such state of the art, it is of great industrial significance to provide a novel process for preparing a latex of an acrylic ester polymer such as polyacrylic acid ester having hydrophilic branches.

Many research works have heretofore been made on the graft copolymerization of monomers to polymers essentially free of ethylenic double bonds, and many patent publications have been issued in this field. However, very few processes are industrially and economically advantageous.

Some attempts have been made to obtain a graft copolymer by copolymerizing compounds having two double bonds to thereby synthesize a polymer having residual double bonds the side chain and grafting another double bond-containing compound to the so formed polymer having residual double bonds. For instance, the specification of U.S. Pat. No. 2,441,515 (issued in 1948) teaches that a polymer having residual double bonds can be prepared when styrene is copolymerized with allyl acrylate. Further, the specification of U.S. Pat. No. 2,958,673 (issued in 1960) discloses the graft copolymerization of styrene to a copolymer of butyl acrylate and allyl acrylate. In this case, of the two double bonds of allyl acrylate, one on the acrylic acid side has a higher polymerizing activity, and therefore, butyl acrylate is copolymerized mainly with the double bond on the acrylic acid side of allyl acrylate and it is possible to leave the double bond on the allyl group side by stopping the polymerization appropriately. However, in this case, a good grafting efficinecy cannot be obtained and it is difficult to obtain a graft copolymer having an industrial utility.

Moreover, it has been known to graft-copolymerize methyl methacrylate to a copolymer of an acrylic acid ester monomer and allyl acrylate or allyl methacrylate. Also in this case, however, the grafting efficiency of methyl methacrylate is low.

We have now developed a process for the preparation of graft copolymers in which a much higher grafting efficiency can be obtained than in the abovementioned conventional processes. More specifically, it was recently found that when, for example, a small quantity of monoallyl maleate is emulsion copolymerized with an alkyl acrylate, a copolymer having pendant double bonds can be prepared in a good yield and that when, for instance, styrene is grafted to such polymer, a graft copolymer can be obtained at a very high grafting efficiency.

Based on this finding, we have conducted strenuous research with a view to developing a process which will overcome the above-mentioned defects of the conventional processes and can meet the industrial demand in the art. As a result, we have now found that a graft copolymer of an optional graft ratio can be prepared at a very high grafting efficiency with economical advantages when at least one comonomer selected from the group consisting of monoallyl maleate, monoallyl fumarate and derivatives thereof is employed; that an acrylic ester rubber especially preferable for formation of an AAS polymer composition and of an impact-resistant polyvinyl chloride composition can be prepared by the use of such comonomer; and that it is also possible with use of such comonomer to prepare a graft copolymer of the multi-layer structure with a high efficiency.

It is therefore a primary object of this invention to provide a novel process for the preparation of a graft polymer of a high graft ratio and a graft copolymer of the multi-layer structure at a high grafting efficiency. Another object of this invention is to provide a process for preparing a graft copolymer of a high graft ratio suitable for formation of AAS polymer compositions, impact-resistant polyvinyl chloride compositions, impact-resistant polystyrene compositions, impact-resistant methacrylate polymer compositions, etc.

In accordance with this invention, there is provided a process for the preparation of graft copolymers which comprises copolymerizing at least one comonomer (A) selected from the group consisting of monoallyl maleate, monoallyl fumarate and their derivatives having a hydrophilic group, which are expressed by the following general formula

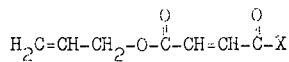

wherein X is —OH, —OCH$_2$—CH$_2$—OH, —OCH$_2$—CH(CH$_3$)—OH, —O—CH(CH$_3$)—CH$_2$—OH, —O—CH$_2$—CH$_2$—NH$_2$ or —NH$_2$, with other ethylenically unsaturated monomer (B) to thereby form a substratum copolymer (AB) (by the term "substratum copolymer" is meant a copolymer usually called "trunk polymer") having pendant double bonds, and graft-copolymerizing at least one ethylenically unsaturated monomer (C) to the substratum copolymer (AB).

As the comonomer (A) of the above general formula to be used in this invention, we can mention, for example, monoallyl maleate (hereinafter abbreviated as MAM), monoallyl fumarate, monoallyl-mono-2-hydroxyethyl maleate, monoallyl-mono-2-hydroxyethyl fumarate, monoallyl-mono-2-hydroxypropyl maleate, monoallyl-mono-2-hydroxypropyl fumarate, monoallyl-mono-2-aminoethyl maleate, monoallyl-2-aminoethyl fumarate and allyl maleamate. Especially, MAM that can readily be prepared by reacting equimolar amounts of allyl alcohol and maleic anhydride is used effectively.

Substratum copolymers (AB) can be obtained by copolymerizing at least one comonomer (A) expressed by the above general formula with other ethylenically unsaturated monomer (B), and the latter monomer (B) is the main component of the copolymer (AB). As the ethylenically unsaturated monomer (B) which is the main component of the substratum copolymer (AB) (hereinafter referred to as "main component monomer (B)"), we can exemplify alkyl acrylates having 1 to 18 carbon atoms in the alkyl portion as methyl acrylate, ethyl acrylate, propyl acrylate, butyl acrylate and 2-ethyl-hexyl acrylate; aralkyl acrylates; alkyl methacrylates having 1 to 18 carbon atoms in the alkyl portion such as methyl methacrylate, ethyl methacrylate, propyl methacrylate, butyl methacrylate and 2-ethyl-hexyl methacrylate; aralkyl methacrylates; and such ethylenically unsaturated monomers as acrylonitrile, methacrylonitrile, styrene, α-methyl styrene, halogenated styrenes, divinyl benzene, vinyl chloride, vinylidene chloride, alkyl vinyl ethers having 1 to 8 carbon atoms in the alkyl portion, vinyl acetate, ethylene, butadiene, isoprene, diallyl phthalate, diacrylates of glycols having 2 to 8 carbon atoms in the glycol portion, dimethacrylates of glycols having 2 to 8 carbon atoms in the glycol portion, trimethylolpropane trimethacrylate, maleic acid, dialkyl esters of maleic acid and of fumaric acid having 1 to 8 carbon atoms in the alkyl portion, acrylic acid, methacrylic acid, itaconic acid and citraconic acid.

Substratum copolymers (AB) can be prepared by reacting mixtures of at least one comonomer (A) expressed by the above general formula and at least one main component monomer (B) by customary polymerization methods such as the emulsion polymerization method, the suspension polymerization method and the solution polymerization method.

For example, when the substratum copolymer (AB) is prepared by the emulsion polymerization method, to a mixture of water, an emulsifier and a polymerization initiator is added a mixture of at least one comonomer (A) expressed by the above general formula and at least one main component monomer (B), and if desired, a salt, a pH-adjusting agent, a chain transfer agent and other additive are further added. Thus, the emulsion polymerization can be conducted according to known procedures. Examples of the emulsifier to be used include fatty acid salts, hydrogenated rosin acid salts, salts of higher alcohol-sulfuric acid esters, alkylbenzene sulfonic acid salts, alkylnaphthalene sulfonic acid salts, naphthalene sulfonic acid-formalin condensates, dialkylsulfosuccinic acid salts, polyoxyethylene alkyl sulfates, polyoxyethylene alkyl ethers, polyoxyethylene alkylaryl ethers, sorbitan fatty acid esters, polyoxyethylene sorbitan fatty acid esters, polyoxyethylene amyl esters, oxyethylene-oxypropylene polymers and fatty acid monoglycerides. These emulsifiers can be used singly or mixtures of two or more of them can also be used.

As the polymerization initiator peroxide compounds such as persulfates, hydrogen peroxide, perborates, benzoyl peroxide, cumene peroxide, caproyl peroxide, tert-butyl hydroperoxide and di-isopropylbenzene hydroperoxide; redox catalysts composed of such a peroxide as exemplified above and a reducing agent such as ascorbic acid, soluble sulfites, hydrosulfites, sulfoxylates and thiosulfates; and free radical-forming compounds such as azobisisobutyronitrile are effectively used. It is also possible to initiate the polymerization by employing ionizing radiation rays instead of polymerization initiators.

As the pH-adjusting agent, we can mention, for example, ammonia, sodium hydroxide, potassium hydroxide, ethanol amine, diethanol amine, ethylene diamine and phosphates.

The amount of the comonomer (A) of the above general formula such as MAM is determined depending on the desired graft copolymer and can be varied within a broad range. For instance, if a monomer mixture (C) of acrylonitrile and styrene is graft-copolymerized to an acrylic ester rubber (AB) for the purpose of preparing an AAS polymer, when the content of the comonomer (A) in the starting monomers of the acrylic ester rubber is adjusted to 0.1 to 20% by weight, preferably 1 to 10% by weight, an AAS polymer having excellent physical properties can be prepared.

Any of the polymerization conditions, such as temperature, pressure and time is not particularly critical, and conditions suitable for obtaining a desired substratum polymer are chosen. For instance, the polymerization temperature is determined depending on the activities of monomers, the kind of a catalyst used and a desired substratum polymer and cannot be stated sweepingly, but the polymerization temperature may be varied within a range of from 0°C. to 130°C. or higher. The polymerization reaction can be conducted under atmospheric or elevated pressure and preferably, it is carried out in an inert atmosphere.

The so obtained substratum polymer (AB) has pendant double bonds, and whether the resulting polymer (AB) is cross-linked or not is determined by the main component monomer (B) used.

Comonomers (A) expressed by the above general formula have two kinds of double bonds, one being derived from allyl alcohol (hereinafter referred to merely as "allyl double bond") and the other being derived from maleic acid or fumaric acid (hereinafter referred to merely as "maleic double bond"). Of these kinds of double bonds, the allyl double bond, like an allyl double bond in an allyl compound such as allyl acetate and diallyl phthalate, can react smoothly with vinyl acetate, vinyl chloride or the like, but it does not react smoothly with styrene, methyl methacrylate or the like. The reactivity of the maleic double bond is quite different from the above reactivity of the allyl double bond. More specifically, the maleic double bond, like a double bond in maleic acid anhydride, copolymerizes quite readily with vinyl acetate, vinyl chloride, styrene or the like and is able to react with an acrylic acid ester.

Accordingly, when, for instance, an acrylic acid ester as the main component monomer (B) is copolymerized with, for instance, monoallyl maleate as the subsidiary monomer component (A) under suitable polymerization conditions, an acrylic ester rubber containing a suitable amount of pendant double bonds, namely a substratum polymer (AB), can be obtained. In such case, in a part of monoallyl maleate (A) both kinds of double bonds participate in the copolymerization reaction, and as a result, the cross linkage is formed in the molecule of the substratum polymer (AB). In order to improve the impact resistance of polymer compositions, it is essential that such cross linkage is present to some extent in the molecule of the such stratum polymer (AB). In this invention, the amount of the cross linkage can readily be increased or decreased optionally by changing the polymerization conditions accordingly to known procedures. The pendant double bonds of the substratum polymer (AB) are mainly maleic double bonds, though the reverse is the case sometimes if a specific main component monomer (B) is used.

For some purpose, it is possible to employ two or more ethylenically unsaturated monomers as the main monomer component (B). For instance, a mixture of 0.1 to 20.0% by weight of a comonomer (A), 50.0 to 99.9% by weight of at least one ethylenically unsaturated monomer (B-1) selected from the group consisting of alkyl acrylates and alkyl methacrylates having 1 to 18 carbon atoms in the alkyl portion and 0.0 to 49.9% by weight of at least one other ethylenically unsaturated monomer (B-2) can be used as the monomers constituting the substratum polymer (AB). Still further, it is possible to use, for instance, a monomeric mixture comprising 0.1 to 20.0% by weight of a comonomer (A), 50.0 to 99.9% by weight of styrene (B-1) and 0.0 to 49.9% by weight of at least one other ethylenically unsaturated monomer (B-2). In this case, a rigid substratum polymer (AB) is prepared.

In case a polystyrene latex, a polyvinyl chloride latex, an ethylene-vinyl acetate copolymer latex, a polybutadiene latex, a natural rubber latex or the like is made present as the seed latex in preparing the substratum polymer, it is possible to form a substratum polymer having the internal nucleus composed of such seed latex.

As the ethylenically unsaturated monomer (C) to be grafted to the substratum polymer (AB) (hereinafter referred to as "graft-monomer"), monomers capable of being graft-copolymerized with pendant double bonds of the substratum polymer are used. Examples of such monomer include alkyl acrylates having 1 to 18 carbon atoms in the alkyl portion, such as methyl acrylate, ethyl acrylate, propyl acrylate, butyl acrylate, isobutyl acrylate, and 2-ethylhexy acrylate; alkyl methacrylates having 1 to 18 carbon atoms in the alkyl portion, such as methyl methacrylate, ethyl methacrylate, propyl methacrylate, butyl methacrylate, isobutyl methacrylate, 2-ethylhexyl methacrylate, isodecyl methacrylate, lauryl methacrylate, tridecyl methacrylate and stearyl methacrylate; acrylic acid derivatives such as glycidyl acrylate, 2-hydroxyethyl acrylate, 2-hydroxypropyl acrylate, 2-aminoethyl acrylate, dimethylaminoethyl acrylate and t-butylaminoethyl acrylate; methacrylic acid derivatives such as glycidyl methacrylate, 2-hydroxyethyl methacrylate, 2-hydroxypropyl methacrylate, 2-aminoethyl methacrylate, dimethylaminoethyl methacrylate and t-butylaminoethyl methacrylate; acrylonitrile, methacrylonitrile; acrylamide, methacrylamide, N-methylol acrylamide, N-methylol methacrylamide, N-butoxymethyl acrylamide and N-butoxymethyl methacrylamide; styrene, α-methyl styrene halogenated styrene; vinyl chloride and vinyl acetate; ethylene; vinyl ethers having 1 to 8 carbons in the alkyl portion; mono- and di-alkyl esters of maleic acid and of fumaric acid containing 1 to 8 carbon atoms in the alkyl group, such as mono-isopropyl maleate, mono-isobutyl maleate, dibutyl maleate and dibutyl fumarate; maleimide; acrylic acid, methacrylic acid, itaconic acid, citraconic acid and maleic acid; and vinyl pyridine, N-vinyl pyrrolidone and N-vinyl carbazole. These monomers can be used either singly or in the form of mixtures of two or more of them.

The process for the graft copolymerization of the graft-copolymer (C) to the substratum polymer (AB) is not particularly critical in this invention. Known emulsion polymerization and suspension polymerization processes can be adopted conveniently. Of course, it is possible to adopt the solution polymerization technique and the like. For instance, following the procedures for preparing the substratum polymer (AB) according to the emulsion polymerization method, at least one graft-monomer (C) is added to the polymerization system, if necessary together with water, an emulsifier, a polymerization initiator, a pH adjusting agent, a chain transfer agent, etc., and the graft copolymerization is carried out under prescribed conditions, whereby a graft copolymer of a desired graft ratio can be obtained at a high grafting efficiency. Known emulsifiers and polymerization initiators, such as mentioned with respect to the emulsion polymerization for the preparation of the substratum polymer (AB), can be used effectively also for this graft copolymerization.

Furthermore, a mixture comprising at least one comonomer (A) and at least one main component monomer (B) can also be used as the graft-monomer (C) in this invention. In this case, a graft copolymer having pendant double bonds derived from the comonomer (A) is obtained. If a monomer or a mixture of two or more monomers is further grafted to the so formed copolymer, a graft copolymer having a multi-layer structure can be obtained.

One of advantages of the process of this invention is that since the grafting reaction is accomplished mainly by copolymerization, it can be accomplished in a short time effectively and selectively. This advantage is especially prominent when a graft copolymer for an impact resistant resin composition or a graft copolymer having hydrophilic branches is prepared according to the emulsion polymerization process. For instance, in case a butyl acrylate rubber as substratum polymer (AB) is prepared by emulsion polymering butyl acrylate as the main component monomer (B) with MAM as the comonomer (A), since the carboxylic group of MAM is hydrophilic owing to the presence of the hydrophilic carboxylic group, MAM is more densely distributed near the surface of the emulsion particles and at the surface of the particles, the carboxylic group is directed toward the water phase and allyl group is directed toward the monomer phase; therefore maleic double bonds are difficult to participate in the copolymerization, whereas the allyl group participates in the copolymerization in the interior of the emulsion particles, with the consequence that the resulting substratum polymer still contains unreacted maleic double bonds. Accordingly, when styrene or other graft-monomer (C) is grafted to said copolymer, because of the presence of such unreacted double bonds, the graft copolymerization is readily caused to occur on the surface of the emulsion particles. On the other hand, in the interior of the emulsion particles, the copolymerization is hardly allowed to advance, and therefore, it is possible to maintain the glass transition point of the rubber in the impact-resistant polymer composition at a low level. Still further, because a high grafting efficiency is attained, amounts of a homopolymer or copolymer formed as by-product are small as compared with the conventional methods.

Another advantage of this invention resides in that the acrylic ester rubber prepared by the process of this invention is substantially cross-linked and the cross-linking treatment need not necessarily be effected. According to the conventional methods, it is very difficult to impart a cross-linked structure to rubbers free of double bonds such as polyacrylates, and therefore, the cross-linking treatment should be conducted in the conventional methods either after or before the graft copolymerization. In the case of the acrylic ester rubber prepared by the process of this invention, such additional treatment can be omitted.

Still another advantage of this invention is that the starting mono-allyl ester derivatives of maleic acid, especially MAM, can be manufactured easily at low costs, and hence, in accordance with the process of this invention, it is possible to obtain the intended graft copolymer with ease and at low costs. More specifically, MAM can be synthesized by reacting allyl alcohol with maleic anhydride in the absence of a solvent, and allyl alcohol is prepared in great quantity at a cheap cost as an intermediate leading to glycerols. Further, maleic anhydride is a cheap basic starting substance. Therefore, MAM can be prepared easily at low costs.

In order to heighten the hydrophilic property of MAM, it is possible to employ MAM in the form of an alkali metal salt or an ammonium salt. In case it is desired to block the carboxyl group while retaining the hydrophilic property of MAM, it is possible to employ hydrophilic derivatives of MAM. In the case of MAM derivatives and isomers thereof, the synthesis process involves relatively complicated steps as compared with the case of MAM, but since their polymerizability is low, it is possible to synthesize them relatively with ease.

As detailed hereinbelow, in accordance with the process of this invention, it is possible to produce graft copolymers having excellent properties and blends of such graft copolymers with other polymers, which also have excellent properties.

For instance, when in accordance with this invention styrene, a mixture of styrene and acrylonitrile, a mixture of styrene and other monomer, or methyl methacrylate is graft-copolymerized as the graft-monomer (C) to an acrylic ester rubber (AB) prepared by employing butyl acrylate or 2-ethylhexyl acrylate as the main component monomer (B), a graft copolymer having such a high graft ratio as hardly attainable in the conventional processes can be prepared at a high grafting efficiency, and when the resulting graft copolymer is blended with an acrylonitrile-styrene copolymer or a polymer of methyl methacrylate, it is possible to obtain an AAS polymer composition having both excellent mechanical properties and excellent weatherability or an impact-resistant methacrylate polymer composition. In particular, a polymer prepared by using a substratum polymer formed by the emulsion polymerization process is especially excellent in the impact resistance at low temperatures.

When vinyl chloride is graft-copolymerized as the graft-monomer (C) to an acrylic ester rubber as the substratum polymer (AB) prepared according to this invention, it is possible to obtain at a high grafting efficiency a graft copolymer having such a high graft ratio as hardly attainable in the conventional processes. Since the so fromed graft copolymer has a good compatibility with polyvinyl chloride, when it is blended with polyvinyl chloride according to known customary procedures, a polyvinyl composition excellent in the impact resistance can be obtained. Further, a polyvinyl chloride composition containing a great amount of such graft copolymer is rich in softness, and bleeding of a plasticizer, which is an undesired phenomenon observed in a conventional plasticized polyvinyl chloride composition, is not at all caused in this polyvinyl chloride composition, with the consequence that it is possible to use the composition for a very long period without inviting degradation of its excellent properties.

In accordance with this invention, it is also possible to obtain a polymer composition excellent in the impact resistance directly without conducting the blending, if reaction conditions for the graft copolymerization are slightly changed, for instance, by graft-copolymerizing a graft-monomer (C) containing a small amount of a chaintransfer agent to a latex of a substratum polymer (AB), according to the suspension polymerization process.

When a mixture of a monoester of maleic acid and styrene and/or other monomer (C) is grafted to a substratum polymer (AB) formed by copolymerizing a monomeric mixture composed mainly of an acrylate or methacrylate (B) and containing a minor amount of MAM (A), a graft copolymer whose viscosity can be heightened by an alkali or ammonia is obtained and this copolymer is superior to conventional acrylic latices in stability, adhesiveness, pigment dispersibility and other properties. Therefore, it is very useful as an adhesive, a paint, a casein substitute and the like. Further, when a monomeric mixture (C) comprising a monoester of maleic acid, styrene and a small amount of glycidyl methacrylate is grafted to the abovementioned substratum polymer (AB), a thermosetting resin can be obtained. Still further, the process of this invention can be applied to the manufacture of various other valuable substances.

The substratum polymer (AB) prepared by employing styrene as the main component monomer (B) and a comonomer (A) as the subsidiary component has pending allyl double bonds, and when a monomer (C) varying in the kind is graft-copolymerized to substratum polymer (AB), a graft copolymer having excellent properties can be obtained. For instance, if acrylic acid (C) is graft-copolymerized, an ion-exchange resin can be obtained. Further, if a monomeric mixture (C) composed mainly of butyl acrylate and containing a minor amount of MAM is grafted, a graft copolymer having pendant double bonds can be obtained. Still further, when a monomeric mixture (C) composed mainly of styrene is grafted to the substratum polymer (AB), it is possible to obtain a graft copolymer having a double-graft structure containing the polystyrene nucleus in the central portion (namely three-layer structure). If methyl methacrylate, for example, is used instead of styrene, it is possible to obtain a graft copolymer having a three layer structure containing the poly(methyl methacrylate) nucleus in the central portion. Although the concept of polymers having such multilayered structure has been known in the art, it is made possible for the fist time by this invention to produce industrially multi-layered polymers consisting essentially of graft copolymers alone.

This invention will now be illustrated by reference to Referential Example and Working Examples, but of course, the scope of this invention is not at all limited by these Examples.

Throughout Examples, values of "part" and "percent" are all on the weight basis, unless otherwise specifically indicated. The values of "grafting efficiency" and "graft ratio" are those calculated according to the following formulae:

$$\text{Grafting Efficiency (\%)} = \frac{\text{(weight of branch polymer grafted to substratum polymer)}}{\text{(weight of monomer fed for graft polymerization)} \times \text{conversion (\%)} \times 1/100} \times 100$$

$$\text{Graft Ratio (\%)} = \frac{\text{(weight of branch polymer grafted to substratum polymer)}}{\text{(weight of substratum polymer)}} \times 100$$

REFERENTIAL EXAMPLE

To a four-neck flask equipped with a thermometer, a stirrer, an inert gas inlet and a condenser were charged 29 g (0.5 mole) of allyl alcohol and 48.6 g (0.495 mole) of maleic anhydride, and when the temperature was elevated to 45°C. in a nitrogen current, maleic anhydride was completely dissolved. The reaction was carried out for 4 hours under heating at 45°C., and the reaction mixture was subjected to distillation under reduced pressure to remove excessive allyl alcohol. Thus, colorless liquid monoallyl maleate (MAM) was obtained almost quantitatively.

When the purity of the so obtained ester was measured according to the alkali titration method, it was found that the purity was 99.6%.

EXAMPLE 1 a. Preparation of Substratum Polymer (Butyl Acrylate Rubber Latex):

To a glass reactor equipped with a thermometer, a stirrer, a dropping funnel, an inert gas inlet tube and a condenser were charged 200 parts of deionized water, 3.0 parts of sodium lauryl sulfate and 0.4 part of potassium persulfate, and the inside atmosphere of the reactor was replaced by nitrogen. In a nitrogen atmosphere a monomeric mixture composed of 100 parts (89.3%) of butyl acrylate, 8 parts (7.1%) of acrylonitrile and 4 parts (3.6%) of MAM was added dropwise to the charge of the reactor under agitation at a temperature maintained at about 70°C. over a period of 21 minutes. After completion of the dropwise addition, the reaction mixture was agitated at 70°C. for 60 minutes, and it was cooled to room temperature. A small amount of precipitates were separated by filtration and 309 parts of a latex was obtained.

When the polymerization conversion was calculated from the solids content of the so obtained substratum polymer latex, it was found that conversion was 95%.

b. Graft Copolymerization:

To the same reactor as used in (a) above were charged 100 parts of the polymer latex obtained in (a) above, 50 parts of deionized water, 0.67 part of sodium lauryl sulfate and 0.30 part of potassium persulfate. Then, the inside atmosphere of the reactor was replaced by nitrogen, and in a nitrogen atmosphere a monomer mixture composed of 15.7 parts of styrene and 6.7 parts of acrylonitrile was added dropwise to the charge of the reactor at a temperature maintained at 65°C. over a period of 26 minutes. After completion of the dropwise addition, the reaction mixture was agitated at 65°C. for 4 hours to polymerize the monomeric mixture almost completely.

c. Preparation of Acrylonitrile-Styrene Copolymer Latex:

To the same reactor as used in (a) above were charged 1000 parts of deionized water, 12.5 parts of myristic acid, 3.1 parts of potassium hydroxide, 1 part of a sodium salt of a naphthalene sulfonic acid-formaldehyde condensate, 2.5 parts of tripotassium phosphate and 1.5 parts of potassium persulfate. The inside atmosphere of the reactor was replaced by nitrogen, and in a nitrogen atmosphere a mixture composed of 350 parts of styrene, 150 parts of acrylonitrile and 2.5 parts of tertiary dodecylmercaptan was added dropwise to the charge of the reactor at a temperature maintained at 65°C. over a period of 1 hour. After completion of the dropwise addition, the reaction mixture was agitated at 65°C. for 3 hours to obtain a styrene-acrylonitrile copolymer latex in a yield of 99%.

d. Preparation of AAS Polymer of Graft Blend Type:

103.1 parts (33.5 parts as polymer) of the acrylonitrile-styrene copolymer latex obtained in (c) above, 51.1 parts (16.5 parts as polymer) of the graft copolymer latex obtained in (b) above and 0.3 part of 4,4'-butylidene-bis-(6-tert-butyl-3-cresol) were mixed in the emulsion state, and the mixture was added dropwise to dilute sulfuric acid heated to 80°C. The resulting precipitates were washed with deionized water and dried under reduced pressure at 50°C. to obtain 50 parts of a powdery polymer.

In order to stabilize this powdery polymer, 0.3%, based on the polymer, of trinonylphenyl phosphite and 0.6%, based on the polymer, of dilauryl thiodipropionate were incorporated in the powdery polymer. The stabilized polymer was kneaded for 10 minutes by means of a hot roll maintained at 200°C. and molded by means of a hot press maintained at 200°C. to obtain a white opaque film having a good toughness. Even when the so obtained film was pressed at 200°C. for 6 hours in air, no gelation was observed and the film was as thermoplastic and tough as prior to the pressing.

The above-mentioned stabilized polymer was pelletized by means of an extruder, and the resulting pellets were injection molded at 200°C. under a pressure of 200 Kg/cm$^2$ to obtain test specimens. The mechanical properties of the so obtained test specimens were measured at 23°C. to obtain the following results:

Tensile strength*:390 Kg/cm$^2$
Izod impact strength**:20.0 Kg·cm/cm$^2$
Bending strength***:550 Kg/cm$^2$ \* measured according to the method of ASTM D-638
\*\* measured according to the method of ASTM D-256
\*\*\* measured according to the method of ASTM D-790 e. Measurement of Grafting Efficiency:

Parts of the latices obtained in (a) and (b) above were salted out according to customary procedures, and the precipitates were washed with deionized water, and dried in vacuo at 55°C. for 48 hours to obtain an acrylic ester rubber and a powdery graft copolymer.

The so obtained acrylic ester rubber and powdery graft copolymer were subjected to the acetone extraction according to the method of B. D. Gesner disclosed in Journal of Polymer Science, Part A, Vol. 3, pages 3825 – 3827 (1965).

In the case of the acrylic ester rubber 97.0% was left unextracted. This means that the MAM-containing acrylic ester rubber was substantially completely crosslinked. In the case of the powdery graft copolymer, 97.0% was left unextracted. The grafting efficiency of acrylonitrilestyrene in the polymerization reaction (b) was calculated from these values, and it was found that the grafting efficiency was 97% (92% supposed that the substratum polymer in the graft copolymer was completely insoluble). Thus, it was confirmed that the graft copolymerization was conducted with a very high efficiency.

EXAMPLE 2 a. Preparation of Substratum Polymer (Butyl Acrylate Rubber Latex):

To the same reactor as used in (a) of Example 1 were charged 100 parts of deionized water, 1.5 parts of sodium lauryl sulfate and 0.2 part of potassium persulfate, and a monomeric mixture composed of 50 parts of butyl acrylate, 4 parts of acrylonitrile and 2 parts of MAM was added dropwise to the charge of the reactor over a period of 1.3 hours in a nitrogen atmosphere at a temperature maintained at 70°C. After completion of the dropwise addition, the reaction mixture was agitated at 70°C. for 60 minutes to obtain a substratum polymer latex. Conversion of the monomeric mixture was 95%.

b. Graft Copolymerization:

To the same reactor as used in (a) of Example 1 were charged 65 parts (21.7 parts as polymer) of the substratum polymer latex obtained in (a) above, 100 parts of deionized water, 1.5 parts of sodium lauryl sulfate and 0.2 part of potassium persulfate, and a monomer mixture composed of 35 parts of styrene and 15 parts of acrylonitrile was added dropwise to the charge of the reactor over a period of 1 hour in a nitrogen atmosphere at a temperature maintained at 70°C. After completion of the dropwise addition, the reaction mixture was agitated at 70°C. for 2.5 hours to obtain a copolymer latex.

To so obtained latex was salted out according to a customary method, and the precipitates were washed with deionized water dried in vacuo at 55°C. for 48 hours to obtain 69 parts of a powdery polymer. When this powdery polymer was molded into a film at 200°C., a completely transparent film was obtained.

c. Measurement of Grafting Efficiency and Graft Ratio:

The acetone extraction was effected with respect to each of the substratum polymer and graft copolymer obtained in (a) and (b) above in the same manner as described in (e) of Example 1. The unextracted remaining portions were 97.4% and 96.8%, respectively, from which the grafting efficiency was calculated to be 96.7% (95.4% supposed that the substratum polymer in the graft copolymer was completely insoluble). The graft ratio was calculated to be about 220%. From the foregoing, it was found that the graft copolymerization was conducted with a very high efficiency even at such high graft ratio

EXAMPLE 3 a. Preparation of Substratum Polymer:

The procedures of (a) of Example 1 were repeated in the same manner except that after completion of the dropwise addition, the reaction mixture was agitated at 70°C. for 5 hours, to obtain a substratum polymer latex. Conversion of the monomers was about 99%.

b. Graft Copolymerization:

To the same reactor as used in (a) of Example 1 were charged 100 parts of the substratum polymer latex obtained in (a) above, 50 parts of deionized water, 0.69 part of sodium lauryl sulfate and 0.3 part of potassium persulfate, and in a nitrogen atmosphere a monomer mixture composed of 16.1 parts of styrene and 6.9 parts of acrylonitrile was added dropwise to the charge of the reactor over a period of 27 minutes at a temperature maintained at 65°C. After completion of the dropwise addition, the reaction mixture was agitated at 65°C. for 4 hours to obtain a copolymer latex.

The so obtained latex was salted out and post treatments were conducted in the same manner as in (e) of Example 1 to obtain 55 parts of a powdery graft copolymer.

c. Measurement of Grafting Efficiency:

The acetone extraction was effected in the same manner as described in (e) of Example 1 with respect to each of the substratum polymer and graft copolymer obtained in (a) and (b) above. The unextracted remaining portions were found to be 95.7% and 96.9%, respectively, from which the grafting efficiency was calculated to be 98% (93% supposed that the substratum polymer in the graft copolymer was completely insoluble).

EXAMPLE 4

Procedures of (a) and (b) of Example 3 were repeated in the same manner except that in preparing the substratum polymer 2-ethylhexyl acrylate was employed instead of butyl acrylate, to obtain similar results.

EXAMPLE 5

Procedures of (a) and (b) of Example 3 were repeated in the same manner except that in preparing the substratum polymer methacrylonitrile was employed instead of acrylonitrile, to obtain similar results.

EXAMPLE 6

Procedures of (a) and (b) of Example 3 were repeated in the same manner except that in preparing the substratum polymer vinyl acetate was used instead of acrylonitrile, to obtain similar results.

EXAMPLE 7

Procedures of (a) and (b) of Example 3 were repeated in the same manner except that in preparing the substratum polymer 5 parts of monoallyl monohydroxyethyl maleate was employed instead of 4 parts of MAM, to obtain similar results.

EXAMPLE 8 a. Preparation of Substratum Polymer (Butyl Acrylate Rubber Latex):

To the same reactor as employed in (a) of Example 1 were charged 200 parts of deionized water, 3.0 parts of sodium lauryl sulfate and 0.5 part of potassium persulfate, and in a nitrogen atmosphere a monomer mixture composed of 100 parts of butyl acrylate, 8 parts of acrylonitrile, 2 parts of MAM and 2 parts of ethyleneglycol diacrylate was added dropwise to the charge of the reactor over a period of 26 minutes at a temperature maintained at 70°C. After completion of the dropwise addition, the reaction mixture was agitated at 70°C. for 2 hours to obtain a substratum polymer latex. Conversion of the monomers was 98.7%.

b. GRAFT COPOLYMERIZATION:

To the same reactor as employed in (a) of Example 1 were charged 100 parts (36.1 parts as polymer) of the substratum polymer latex obtained in (a) above, 50 parts of deionized water, 0.7 parts of sodium lauryl sulfate and 0.3 part of potassium persulfate, and in a nitrogen atmosphere a monomer mixture composed of 16.8 parts of styrene and 7.2 parts of acrylonitrile was added dropwise to the charge of the reactor over a period of 28 minutes at a temperature maintained at 65°C. After completion of the dropwise addition, the reaction mixture was agitated at 65°C. for 4 hours to obtain a graft copolymer latex.

To so obtained latex was salted out and post treatments were carried out in the same manner as in (e) of Example 1 to obtain 59.1 parts of a powdery polymer.

c. Measurement of Grafting Efficiency:

The substratum polymer and graft copolymer obtained in (a) and (b) above were subjected to the acetone extraction in the same manner as in (e) of Example 1. The unextracted remaining portions were 98.3% and 97.1%, respectively, from which the grafting efficiency was calculated to be 95.6% (92.8% supposed that the substratum polymer in the graft copolymer was completely insoluble).

EXAMPLE 9

Procedures of (a) and (b) of Example 8 was repeated in the same manner except that in preparing the substratum polymer diallyl phthalate was used instead of ethyleneglycol diacrylate, to obtain similar results.

EXAMPLE 10

Procedures of (a) and (b) of Example 8 were repeated in the same manner except that in preparing the substratum polymer trimethylol propane trimethacrylate was used instead of ethyleneglycol diacrylate, to obtain similar results.

EXAMPLE 11

Procedures of (a) and (b) of Example 8 were repeated in the same manner except that in preparing the substratum polymer butylene dimethylacrylate was employed instead of ethyleneglycol diacrylate, to obtain similar results.

EXAMPLE 12 a. Preparation of Substratum Polymer:

The procedures of (a) of Example 1 were repeated in the same manner except that 6 parts of MAM was used instead of 4 parts of MAM, to obtain a substratum polymer latex.

Conversion of the monomers was 93.5%.

b. Graft Copolymerization:

To the same reactor as employed in (a) of Example 1 were charged 100 parts of the substratum polymer latex obtained in (a) above, 50 parts of deionized water, 0.67 parts of sodium lauryl sulfate and 0.30 part of potassium persulfate, and in a nitrogen atmosphere 22.4 parts of methyl methacrylate was added dropwise to the charge of the reactor over a period of 25 minutes at a temperature maintained at 65°C. After completion of the dropwise addition, the reaction mixture was agitated at 65°C. for 4 hours to obtain a copolymer latex. Substantially all of methyl methacrylate added was polymerized.

The so obtained latex was salted out and post treatments were carried out in the same manner as in (e) of Example 1 to obtain 56 parts of a powdery polymer.

c. Measurement of Grafting Efficiency:

The substratum polymer and graft copolymer obtained in (a) and (b) above were subjected to the acetone extraction in the same manner as in (e) of Example 1. The unextracted remaining portions were 98.7% and 83.3%, respectively, from which the grafting efficiency was calculated to be 59.0% (58.0% supposed that the substratum polymer in the graft copolymer was completely insoluble). This means that methyl methacrylate was graft-copolymerized with a high efficiency.

EXAMPLE 13 a. Preparation of Substratum Polymer:

A substratum polymer latex was prepared by repeating the procedures of (a) of Example 12 in the same manner except that the dropwise addition of the monomeric mixture was conducted over a period of 22 minutes.

Conversion of the monomers was 91%.

b. Graft copolymerization:

To a stainless steel autoclave were charged 100 parts (32.6 parts as polymer) of the substrttum polymer latex obtained in (a) above, 50 parts of deionized water, 0.22 part of sodium lauryl sulfate, 0.30 part of potassium persulfate and 0.11 part of tripotassium phosphate, and the inside atmosphere of the autoclave was replaced by nitrogen. 14 parts of vinyl chloride was introduced into the autoclave, and the mixture was agitated at 65° – 70°C. for 4.5 hours to obtain a copolymer latex.

The so obtained latex was salted out and post treatments were carried out in the same manner as in (e) of Example 1 to obtain 43.4 parts of a powdery polymer.

c. Measurement of Grafting Efficiency:

The substratum polymer and graft copolymer obtained in (a) and (b) above were subjected to the tetrahydrofuran extraction in the same manner as described in (e) of Example 1. The unextracted remaining portions were 98.4% and 98.6%, respectively, from which the grafting efficiency was calculated to be 97.2% (93.0% supposed that the substratum polymer in the graft copolymer was completely insoluble).

EXAMPLE 14 a. Preparation of Substratum Polymer:

A substratum polymer latex was prepared under the same conditions as adopted in (a) of Example 1. Conversion of the monomers was about 94%.

Graft Copolymerization:

To a stainless autoclave were charged 100 parts (33.4 parts as polymer) of the substratum polymer latex obtained in (a) above, 50 parts of deionized water, 0.22 part of sodium lauryl sulfate, 0.30 part of potassium persulfate and 0.11 part of tripotassium phosphate, and the inside atmosphere of the autoclave was replaced by nitrogen. Then, 22.4 parts of vinyl chloride was introduced into the autoclave under pressure, and the mixture was agitated at 65° – 70°C. for 3.5 hours to obtain a copolymer latex.

The so obtained latex was salted out and post treatments were carried out in the same manner as in (e) of Example 1 to obtain 54.9 parts of a powdery polymer.

c. Measurement of Grafting Efficiency:

When the grafting efficiency was determined in the same manner as in (c) of Example 13, it was found that the grafting efficiency was 94.0% (91% supposed that the substratum polymer in the graft copolymer was completely insoluble).

d. Blend of Graft Copolymer and Polyvinyl Chloride:

25 parts of the powdery graft copolymer obtained in (b) above, 100 parts of a commercially available vinyl chloride polymer (product having an average degree of polymerization of 1,030, manufactured by Chisso Kabushiki Kaisha) and 3 parts of a stabilizer of the tin type, were mixed together, and the mixture was kneaded for 5 minutes by means of a hot roll maintained at 190°C. and molded into a film by means of a hot press maintained at 190°C. An opaque tough film in which the graft copolymer powder was uniformly dispersed was obtained.

EXAMPLE 15 a. Graft Copolymerization:

To the same reactor as used in (a) of Example 1 were charged 70 parts (23.4 parts as polymer) of the substratum polymer latex obtained in (a) of Example 14, 50 parts of deionized water, 0.67 part of sodium lauryl sulfate and 0.30 part of potassium persulfate, and in a nitrogen atmosphere 22.4 parts of methyl methacrylate was added dropwise to the charge of the reactor over a period of 25 minutes at a temperature maintained at 65°C. After completion of the dropwise addition, the reaction mixture was agitated at 65°C. for 4 hours to obtain a copolymer latex.

The so obtained latex was salted out and post treatments were carried out in the same manner as in (e) of Example 1 to obtain 45.6 parts of a powdery polymer.

b. Measurement of Grafting Efficiency:

When the grafting efficiency was determined in the same manner as in (c) of Example 12, it was found that the grafting efficiency was 65.1% (62.4% supposed that the substratum polymer in the graft copolymer was completely insoluble).

c. Blend of Graft Copolymer and Polyvinyl Chloride:

10 parts of the powdery graft copolymer obtained in (a) above, 90 parts of a commercially available vinyl chloride polymer and 2.5 parts of a stabilizer of the tin type were mixed together, and the mixture was molded into a film in the same manner as in (d) of Example 8 to obtain an opaque tough film in which the powdery graft copolymer was uniformly dispersed.

EXAMPLE 16 a. Graft Copolymerization:

Procedures of (a) of Example 15 were repeated in the same manner except that as the graft-monomer 22.7 parts of styrene was used instead of 22.4 parts of methyl methacrylate. Thus, 46.1 parts of a powdery graft copolymer was obtained.

b. Measurement of Grafting Efficiency:

When the grafting efficiency was determined in the same manner as in (e) of Example 1, it was found that the grafting efficiency was 99.3% (96.7% supposed that the substratum polymer in the graft copolymer was completely insoluble).

EXAMPLE 17 a. Preparation of Substratum Polymer (Styrene Polymer Latex):

To the same reactor as employed in (a) of Example 1 were charged 200 parts of deionized water, 3.0 parts of sodium lauryl sulfate and 0.4 part of potassium persulfate, and in a nitrogen atmosphere a monomer mixture composed of 94.0 parts of styrene, 4.0 parts of MAM and 2 parts of commerically available divinyl benzene (containing 55% of divinyl benzene, the balance being mainly composed of a mixture of ethylvinyl benzene and diethyl benzene) was added dropwise to the charge of the reactor over a period of 19 minutes at a temperature maintained at 70°C. After completion of the dropwise addition, the reaction mixture was agitated at 70°C. for 90 minutes to obtain a substratum polymer latex.

Conversion of the monomers was 98%.

b. Graft Copolymerization:

To the same reactor as employed in (a) of Example 1 were charged 80 parts (25.9 parts as polymer) of the substratum polymer latex obtained in (a) above, 50 parts of deionized water, 0.6 part of sodium lauryl sulfate and 0.10 part of potassium persulfate, and in a nitrogen atmosphere 20 parts of butyl acrylate was added dropwise to the charge of the reactor over a period of 13 minutes at a temperature maintained at 70°C. After completion of the dropwise addition, the reaction mixture was agitated at 70°C. for 3 hours to obtain a copolymer latex.

The so obtained latex was salted out and post treatments were carried out in the same manner as in (e) of Example 1 to obtain 45.5 parts of a powdery copolymer.

c. Measurement of Grafting Efficiency:

The substratutm polymer and graft copolymer obtained in (a) and (b) above were subjected to the acetone extraction in the same manner as described in (e) of Example 1. The unextracted remaining portions were 100% and 98.6%, respectively, from which the grafting efficiency was calculated to be 96.7%.

EXAMPLE 18 a. Graft Copolymerization:

To the same reactor as employed in (a) of Example 1 were charged 60 parts (19.4 parts as polymer) of the substratum polymer latex obtained in (a) of Example 17, 70 parats of deionized water, 0.9 part of sodium lauryl sulfate and 0.15 part of potassium persulfate, and in a nitrogen atmosphere, a monomer mixture composed of 30 parts of butyl acrylate and 1.16 parts of MAM was added dropwise under agitation to the charge of the reactor over a period of 18 minutes at a temperature maintained at 70°C. After completion of the dropwise addition, the reaction mixture was agitated at 70°C. for 1 hour to obtain a copolymer latex.

Then, 60 parts of deionized water, 0.1 part of sodium lauryl sulfate and 0.3 part of potassium persulfate were charged into the reactor containing the copolymer latex, and in a nitrogen atmosphere, a monomer mixture composed of 21 parts of styrene and 9 parts of acrylonitrile was added dropwise to the charge of the reactor over a period of 11 minutes at a temperature maintained at 65°C. After completion of the dropwise addition, the mixture was agitated at 65°C. for 3.5 hours to obtain a copolymer latex.

The so obtained latex was salted out and post treatments were carried out in the same manner as in (e) of Example 1 to obtain 77.0 parts of a powdery polymer. This means that 96% of the monomer mixture was polymerized.

b. Measurement of Grafting Efficiency:

The graft copolymer obtained in (a) above was subjected to the acetone extraction in the same manner as described in (e) of Example 1, 98.4% of the polymer was left unextracted. From this value, the overall grafting efficiency throughout the double graft copolymerization was calculated to be about 98%.

EXAMPLE 19 a. Preparation of Seed Latex:

Procedures of (a) of Example 17 were repeated in the same manner except that 98 parts of styrene was used instead of 94 parts of styrene and 4 parts of MAM, to obtain a styrene copolymer latex. Conversion of the monomers was 98%.

b. Preparation of Substratum Polymer and Graft Copolymer:

To the same reactor as used in (a) of Example 1 were charged 60 parts of the latex obtained in (a) above, 70 parts of deionized water, 0.9 part of sodium lauryl sulfate and 0.15 part of potassium persulfate, and in a nitrogen atmosphere a monomer mixture composed of 30 parts of butyl acrylate and 1.16 parts of MAM was added dropwise to the charge of the reactor over a period of 18 minutes under agitation at a temperature maintained at 70°C. After completion of the dropwise addition, the reaction mixture was agitated at 70°C. for 60 minutes to obtain a substratum polymer latex.

A similar graft copolymer to that obtained in Example 18 was obtained at a high grafting efficiency from the so obtained substratum polymer having the polystyrene nucleus in the central portion.

EXAMPLE 20

Procedures of (b) of Example 19 were repeated in the same manner except that a polyvinyl chloride latex was used instead of the polystyrene latex, to obtain similar results.

EXAMPLE 21

Procedures of (b) of Example 19 were repeated in the same manner except that an ethylene-vinyl acetate copolymer latex was used instead of the polystyrene latex, to obtain similar results.

EXAMPLE 22

Procedures of (b) of Example 19 were repeated in the same manner except that a polybutadiene latex was used instead of the polystyrene latex, to obtain similar results.

Example 23

Procedures of (b) of Example 19 were repeated in the same manner except that a natural rubber latex was used instead of the polystyrene latex, to obtain similar results.

EXAMPLE 24 a. Preparation of Substratum Polymer (Butyl Acrylate Copolymer Latex):

To the same reactor as used in (a) of Example 1 were charged 1,830 parts of deionized water, 30 parts of sodium lauryl sulfate and 3.4 parts of ammonium persulfate, and the inside atmosphere of the reactor was replaced by nitrogen. In a nitrogen atmosphere, a monomer mixture composed of 1,000 parts of butyl acrylate, 80 parts of acrylonitrile and 40 parts of MAM and 170 parts of a 1% aqueous solution of sodium bisulfite were added dropwise separately to the charge of the reactor under agitation over a period of 30 minutes at a temperature maintained at about 50°C. After completion of the dropwise addition, the reaction mixture was agitated at 62°C. for 3 hours. Conversion of the monomers was 97%.

b. Graft Copolymerization:

To the same reactor as used in (a) of Example 1 were charged 200 parts of the substratum polymer latex obtained in (a) above, 100 parts of deionized water, 1.38 parts of sodium lauryl sulfate and 0.6 part of ammonium persulfate, and the inside atmosphere of the reactor was replaced by nitrogen. In a nitrogen atmosphere a monomer mixture composed of 19.87 parts of styrene and 20.28 parts of mono-iso-butyl maleate (hereinafter referred to as "MIBM") was added dropwise to the charge of the reactor over a period of 20 minutes at a temperature maintained at 75°C. After completion of the dropwise addition, the reaction mixture was agitated at 75°C. for 4 hours. Conversion was 87.1%.

The substratum polymer and graft copolymer were separated from the latices obtained in (a) and (b) above, dried and subjected to the acetone extraction. As a result, it was found that the unextracted remaining portions were 96% in the case of the substratum polymer and 92% in the case of the graft copolymer. The grafting efficiency of styrene-MIBM was calculated from these values to be 83%.

The graft copolymer latex obtained in (b) above was diluted with deionized water so that the solids content is 15%, and when aqueous ammonia was added thereto, the viscosity was raised to 17,500 cp from 43 cp. The viscosity was measured by employing a Brookfield viscometer.

EXAMPLE 25 a. Preparation of Substratum Polymer (Methyl Methacrylate-Butyl Acrylate Copolymer Latex):

To the same glass reactor as used in (a) of Example 1 were charged 2000 parts of deionized water, 55 parts of Emar NC (sodium alkylphenyl polyoxyethylene sulfate, manufactured by Kao Atlas) and 6.0 parts of ammonium persulfate, and the inside atmosphere of the reactor was replaced by nitrogen. In a nitrogen atmosphere a monomer mixture composed of 500 parts of methyl methacrylate, 500 parts of butyl acrylate, 80 parts of acrylonitrile and 40 parts of MAM was added dropwise to the charge of the reactor under agitation over a period of 30 minutes at a temperature maintained at about 67°C. After completion of the dropwise addition, the reaction mixture was agitated at 70°C. for 4 hours. Conversion of the monomer mixture was 96%.

b. Graft Copolymerization:

To the same reactor as used in (a) of Example 1 were charged 200 parts of the polymer latex obtained in (a) above, 100 parts of deionized water, 1.1 parts of Emal NC and 0.6 part of ammonium persulfate, and in a nitrogen atmosphere a monomer mixture composed of 15.9 parts of styrene, 4.0 parts of methyl acrylate and 20.3 parts of MIBM was added dropwise to the charge of the reactor over a period of 20 minutes at a temperature maintained at 75°C. After completion of the dropwise addition, the reaction mixture was agitated at 75°C. for 4 hours. Conversion of the monomer mixture was 94%.

The so formed graft copolymer latex was diluted with deionized water so that the solids content was 15%, and when aqueous ammonia was added to the diluted latex, the viscosity of the latex was increased to 7,000 cp from 5 cp. The viscosity was measured with use of a Brookfield viscometer. The latex neutralized with aqueous ammonia formed a transparent uniform film at a temperature exceeding 25°C.

EXAMPLE 26

Procedures of Example 25 were repeated in the same manner except that in preparing the substratum polymer isobutyl methacrylate was used instead of methyl methacrylate, to obtain similar results.

EXAMPLE 27

Procedures of Example 25 were repeated in the same manner except that in preparing the substratum polymer lauryl methacrylate was used instead of methyl methacrylate, to obtain similar results.

EXAMPLE 28

Procedures of Example 25 were repeated in the same manner except that in the graft copolymerization mono-isopropyl maleate was used instead of MIBM, to obtain similar results.

EXAMPLE 29

To the same reactor as used in (a) of Example 1 were charged 200 parts of the copolymer latex obtained in (a) of Example 24, 100 parts of deionized water, 1.38 parts of sodium lauryl sulfate and 0.6 part of ammonium persulfate, and the inside atmosphere of the reactor was replaced by nitrogen. In a nitrogen atmosphere a monomer mixture composed of 15.0 parts of methyl methacrylate and 17.2 parts of MIBM was added dropwise to the charge of the reactor over a period of 25 minutes at a temperature maintained at 75°C. After completion of the dropwise addition, the reaction mixture was agitated for 4 hours at 75°C. Conversion of the monomer mixture was 92%.

EXAMPLE 30

To the same reactor as employed in (a) of Example 1 were charged 200 parts of the polymer latex obtained in (a) of Example 24, 100 parts of deionized water, 1.38 parts of sodium lauryl sulfate and 0.6 part of ammonium persulfate, and the inside atmosphere of the reactor was replaced by nitrogen. In a nitrogen atmosphere a monomer mixture composed of 19.9 parts of styrene, 20.3 parts of MIBM and 4.0 parts of glycidyl methacrylate (hereinafter referred to as GMA) was added dropwise to the charge of the reactor over a period of 24 minutes at a temperature maintained at 75°C. After completion of the dropwise addition, the reaction mixture was agitated for 4 horus at 75°C. Conversion of the monomer mixture was 89.3%.

The so obtained graft copolymer latex was coated in a thickness of 40 μ on a metal sheet, and it was baked at 150°C. for 30 minutes. A transparent, tough film excellent in chemical resistance was obtained.

EXAMPLE 31

To the same reactor as used in (a) of Example 1 were charged 200 parts of the copolymer latex obtained in (a) of Example 25, 100 parts of deionized water, 1.1 parts of Emal NC and 0.6 part of ammonium persulfate, and the inside atmosphere of the reactor was replaced by nitrogen. in a nitrogen atmosphere, a monomer mixture composed of 19.9 parts of styrene, 20.3 parts of MIBM and 4.0 parts of GMA was added dropwise to the charge of the reactor over a period of 25 minutes at a temperature maintained at 75°C. After completion of the dropwise addition, the polymerization was further advanced for 4 hours under agitation at 75°C. Conversion of the monomer mixture was 92%.

The so obtained copolymer latex was coated and baked on a metal sheet in the same manner as in Example 30 to obtain a transparent, tough film excellent in chemical resistance.

EXAMPLE 32

To the same reactor as employed in (a) of Example 1 were charged 200 parts of the polymer latex obtained in (a) of Example 25, 100 parts of deionized water and 0.11 part of potassium persulfate, and in a nitrogen atmosphere, a monomer mixture composed of 160 parts of 2-ethylhexyl acrylate, 9 parts of methyl acrylate, 5.4 parts of methacrylic acid and 5.4 parts of 2-hydroxypropyl acrylate and an aqueous solution consisting of 70 parts of water, 0.11 part of potassium persulfate, 11 parts of Pluronic F 68 (80% ethyleneoxide-20% propyleneoxide block copolymer) and 2.3 parts of sodium dodecylbenzene sulfonate were added dropwise separately from different dropping funnels to the charge of the reactor over a period of 3 hours at a temperature maintained at 75° – 90°C. After completion of the dropwise addition, the reaction mixture was heated at the above temperature for 1 hour under agitation. Thus, a graft copolymer latex having an adhesiveness was obtained.

EXAMPLE 33

To the same reactor as used in (a) of Example 1 were charged 200 parts of the polymer latex obtained in (a) of Example 25, 100 parts of deionized water, 1.3 parts of sodium lauryl sulfate, 0.15 part of potassium persulfate and 0.30 part of sodium bisulfite, and in a nitrogen atmosphere a monomer mixture composed of 40 parts of butyl methacrylate, 1.5 parts of N-methylolacrylamide and 1.0 part of acrylamide was added dropwise to the charge of the reactor over a period of 30 minutes at a temperature maintained at 35°C. After completion of the dropwise addition, the reaction mixture was agitated at 35°C. for 4 hours to obtain a graft copolymer latex having a thermosetting property.

What we claim is:

1. A process for the preparation of graft copolymers which comprises graft-copolymerizing styrene to substratum polymer (AB) having pendent double bonds, said substratum polymer (AB) being prepared from 0.1 to 20.0% by weight of at least one comonomer (A) expressed by the following general formula

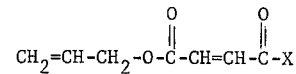

wherein X is —OH, —O—CH$_2$—CH$_2$—OH, —O—CH$_2$—CH(CH$_3$)—OH, —O—CH(CH$_3$)—CH$_2$—OH, —O—CH$_2$—CH$_2$—NH$_2$ or —NH$_2$,
and 80.0 to 99.9% by weight of at least one ethylenically unsaturated monomer (B) selected from the group consisting of alkyl acrylates and alkyl methacrylates having 1 to 18 carbon atoms in the alkyl portion.

2. A process as set forth in claim 1 wherein comonomer (A) is monoallyl maleate expressed by the following formula

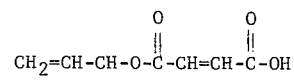

3. A process as set forth in claim 1 wherein the substratum polymer (AB) is prepared by emulsion polymerization.

4. A process as set forth in claim 1 wherein the substratum polymer (AB) is prepared by emulsion polymerization conducted in the presence of a seed latex.

5. A process as set forth in claim 1 wherein the graft polymerization is carried out by emulsion polymerization or suspension polymerization.

* * * * *